United States Patent
Chon et al.

(10) Patent No.: US 6,683,677 B2
(45) Date of Patent: Jan. 27, 2004

(54) APPARATUS FOR CALCULATING OPTICAL FLOW AND CAMERA MOTION USING CORRELATION MATCHING AND SYSTEM MODEL IN MOVING IMAGE

(75) Inventors: Jae Choon Chon, Taejon (KR); Young Jae Lim, Taejon (KR); Seong Ik Cho, Taejon (KR); Kyung Ok Kim, Taejon (KR); Young Kyu Yang, Taejon (KR)

(73) Assignee: Electronics and Telecommunications Research Institution, Taejon (KR)

( * ) Notice: Subject to any disclaimer, the term of this patent is extended or adjusted under 35 U.S.C. 154(b) by 0 days.

(21) Appl. No.: 10/098,430

(22) Filed: Mar. 18, 2002

(65) Prior Publication Data

US 2003/0117611 A1 Jun. 26, 2003

(30) Foreign Application Priority Data

Dec. 24, 2001 (KR) .......................... 2001-84212

(51) Int. Cl.⁷ .............................. G01F 3/36; G06K 9/00; H04N 5/14; H04N 9/64; G03B 17/00
(52) U.S. Cl. ......................... 356/28; 382/107; 348/700; 396/55
(58) Field of Search .................. 356/28, 28.5; 382/107; 348/142, 700, 701; 396/54, 55

(56) References Cited

U.S. PATENT DOCUMENTS

| | | | |
|---|---|---|---|
| 5,030,984 A * | 7/1991 | Buckler et al. ............. | 396/153 |
| 5,673,207 A * | 9/1997 | Nomura ...................... | 348/701 |
| 5,828,444 A * | 10/1998 | Nomura ....................... | 356/28 |
| 6,052,124 A * | 4/2000 | Stein et al. ................. | 345/419 |
| 6,108,032 A * | 8/2000 | Hoagland .................... | 348/144 |
| 6,211,912 B1 * | 4/2001 | Shahraray ................ | 348/228.1 |
| 6,303,920 B1 | 10/2001 | Wixson | |
| 6,456,731 B1 * | 9/2002 | Chiba et al. ................ | 382/107 |
| 6,490,364 B2 * | 12/2002 | Hanna et al. ............... | 382/107 |
| 6,507,661 B1 * | 1/2003 | Roy ............................ | 382/107 |
| 6,512,537 B1 * | 1/2003 | Shimizu et al. ............. | 348/155 |

OTHER PUBLICATIONS

Arun Kumar, et al.; Optical Flow: A Curve Evolution Approach; IEEE Transactions on Image Processing; vol. 5, No. 4; Apr. 1996; p. 598–610.

* cited by examiner

Primary Examiner—Thomas H. Tarcza
Assistant Examiner—Brian Andrea
(74) Attorney, Agent, or Firm—Jacobson Holman PLLC

(57) ABSTRACT

An apparatus for calculating optical flow and camera motion using correlation matching and a system model in a moving image, in which the calculation of the optical flow is executed accurately in real time, even when an image rotation or zoom change has occurred. The apparatus comprises a feature point extracting section for extracting a feature point of a sequence of input images (previous image and current image); an optical flow calculating section for calculating an optical flow by use of the feature point extracted by the feature point extracting section; a first camera motion calculating section for calculating a camera motion by use of the optical flow calculated by the optical flow calculating section; a second camera motion calculating section for eliminating an incorrect optical flow from the optical flow calculated by the optical flow calculating section and again calculating camera motion; an optical flow location estimating section for estimating a location of the optical flow by estimating a distance difference between an estimated feature point location and a current feature point location in the previous image according to the camera motion calculated by the second camera motion calculating section; and a weighted value calculating section for calculating a weighted value according to the camera motion calculated by the second camera motion calculating section and providing the weighted value to the optical flow calculating section.

13 Claims, 5 Drawing Sheets

APPARATUS FOR CALCULATING OPTICAL FLOW AND CAMERA MOTION USING CORRELATION MATCHING AND SYSTEM MODEL IN MOVING IMAGE

BACKGROUND OF THE INVENTION

1. Field of the Invention

The present invention relates to an apparatus for calculating optical flow and camera motion using correlation matching and a system model in a moving image, and more particularly, to an apparatus for calculating optical flow and camera motion using correlation matching and a system model in a moving image, in which after the optical flow is acquired from a sequence of moving images, the camera motion is calculated.

2. Background of the Related Art

Up to now, in order to calculate an optical flow by extracting feature points in a sequence of moving images, a gradient-based approach, a frequency-based approach, and a correlation-based approach have been proposed.

The Hron and Schunck algorithm is typical of the gradient-based approach.

According to such an approach, a pixel point is found with a value that is minimized according to a variation of a peripheral pixel gray value and a variation of a gray value between image frames. The greatest disadvantage of the algorithm is that since the gray value existing in a current frame has to be in a next frame and an object may have moved, it is difficult to apply this approach to quick camera motion and thus to the system in real time.

The frequency-based approach of calculating the optical flow uses a differential value of all of pixel values in the image by employing a band-pass filter for a velocity such as a Gabor filter. This approach also has the same disadvantage as that of the gradient-based approach.

The correlation-based approach is applied to a method of searching a moving object in an MPEG image. The approach has many errors when the image is rotated or a zoom level change occurs, such that an auxiliary method is then required.

Thus, according to the existing methods it is not possible to calculate optical flow in real time, because of calculating the optical flow for all the pixels in the image. The optical flow calculation using correlation matching has a drawback in that, upon the occurrence of an image rotation or zoom change, errors occur in the calculation of the optical flow.

SUMMARY OF THE INVENTION

Accordingly, the present invention is directed to an apparatus for calculating optical flow and camera motion using correlation matching and a system model in a moving image that substantially obviates one or more problems due to limitations and disadvantages of the related art.

An object of the present invention is to provide an apparatus for calculating optical flow and camera motion using correlation matching and a system model in a moving image, in which optical flow is calculated in real time, and may be calculated accurately even when an image rotation or zoom change occurs.

To achieve these objects and other advantages, the present invention employs a method of calculating the optical flow on the basis of a correlation-based approach and using an estimated value, whereby the optical flow calculated in a previous frame is to be positioned in a current frame, on the basis of the system model and the camera motion calculated in the previous frame, upon the occurrence of an image rotation or zoom level change.

In addition, since real time processing is impossible when the optical flow of all of the pixels is calculated, the number of optical flows is controlled so as not to be increased above a certain number by use of a SUSAN edge operation. When calculating the optical flow, the method of combining a correlating matching value with an optical flow location estimated value is characterized in that a correlation matching weighted value is reduced depending upon a rotating and moving value of an optical axis of a CCD camera.

According to one aspect of the present invention, there is provided an apparatus for calculating optical flow and camera motion using correlation matching and a system model in moving images. The apparatus includes a feature point extracting section for extracting a feature point of a sequence of input images (previous image and current image); an optical flow calculating section for calculating an optical flow by use of the feature points extracted by the feature point extracting section; a first camera motion calculating section for calculating a camera motion by use of the optical flow calculated by the optical flow calculating section; a second camera motion calculating section for eliminating an incorrect optical flow among the optical flows calculated by the optical flow calculating section and recalculating camera motion; an optical flow location estimating section for estimating a location of the optical flow by estimating a distance difference between an estimated feature point location and a current feature point location in the previous image according to the camera motion calculated by the second camera motion calculating section; and a weighted value calculating section for calculating a weighted value according to the camera motion calculated by the second camera motion calculating section and providing the weighted value to the optical flow calculating section.

The feature point extracting section comprises a SUSAN edge driving portion for extracting an edge image from the sequence of the input images, and a local max portion for selecting a largest value in a mask size region set in the edge image extracted from the SUSAN edge extracting portion to extract a certain number of feature points. The feature points are extracted by the local max portion in accordance with:

$$S = \left\{ \sum_e - \left( \frac{I(x, y) - I(x + dx, y + dy)}{T} \right)^6 \right\} / G$$

wherein, I is a gray value, T is a threshold value for a difference between the gray values, and G is an edge strength difference between feature point locations of the previous and current images.

The optical flow calculating section comprises a combining subsection for calculating a connecting strength of an edge by use of the information relating to the distance difference between the current feature point location and the estimated feature point location in the previous image provided from the optical flow location estimating section, the weighted values of the correlation, location incorrectness, and edge strength matching provided from the feature point extracting section, and the edge strength difference between the feature points of the previous and current images provided from the feature point extracting section; and a matched feature point extracting subsection for extracting the feature points having the largest connecting strength by use of the connecting strength value provided from the combining subsection and providing the extracted feature points to the first and second camera motion calculating sections. The edge connecting strength E is calculated by the combining subsection in accordance with:

$$E = W_G G + W_{Cl} Cl + W_S S$$

wherein, $W_G$ is a weighted value of a correlation matching, $W_{Cl}$ is a weighted value of a location error matching, $W_S$ is a weighted value of an edge strength matching, G is an edge strength difference between the feature point locations in the previous and current images provided from the feature point extracting section, Cl is a distance difference between the current feature point location and the estimated feature point location in the previous image provided from the optical flow location estimating section, and S is a SUSAN edge strength difference between the feature points of the previous and current images provided from the feature point extracting section.

The first camera motion calculating section comprises a pseudo inverse matrix calculating subsection for calculating a constant of a camera projection formula by use of the optical flow provided from the optical flow calculating section; and a first camera motion calculating subsection for dividing the camera motion by use of the constant of the camera projection formula provided from the pseudo inverse matrix calculating subsection, and providing the resultant to the second camera motion calculating section.

The second camera motion calculating section comprises an optical flow direction and magnitude calculating subsection for calculating a direction and magnitude of the optical flow by use of the value of the camera motion calculated by the first camera motion calculating section; an incorrect optical flow eliminating subsection for eliminating an incorrect optical flow among the optical flows provided from the optical flow calculating section depending upon the direction and magnitude of the optical flow calculated by the optical flow direction and magnitude calculating subsection; and a second camera motion calculating subsection for calculating the camera motion using the optical flow which is not eliminated by the incorrect optical flow eliminating subsection, and providing the camera motion to the weighted value calculating section and the optical flow location estimating section, respectively. The direction and magnitude of the optical flow are calculated by the optical flow direction and magnitude calculating subsection in accordance with:

$$\begin{pmatrix} x_{Ave} \\ y_{Ave} \end{pmatrix} = \begin{pmatrix} x_t \\ y_t \end{pmatrix} + \Delta t \begin{pmatrix} -T_{x,y}/Z_t + T_{z,t}x_t/Z_t + \Omega_{z,t}y_t \\ -T_{y,t+1}/Z_t + T_{z,t}y_t/Z_t - \Omega_{z,t}x_t \end{pmatrix}$$

wherein, $\Delta t$ is a sampling time, $T_x$, $T_y$ and $T_z$ are x, y and z-axis translation of the camera, respectively, and $\Omega_z$ is z-axis rotation of the camera, $x_t$ and $y_t$ are locations in the current frame image, and $x_{Ave}$ and $y_{Ave}$ are standard locations. If the direction $\theta$ of a standard optical flow and the distance $\Delta$ between $x_{Ave}$ and $y_{Ave}$ are outside a predetermined range, the incorrect eliminating subsection determines the calculated optical flow as a mismatched optical flow to eliminate the incorrect optical flow.

The optical flow location estimating section estimates the camera motion, depending upon the optical flow, from which the incorrect optical flow has been eliminated, and the camera motion provided from the second camera motion calculating section, in accordance with:

$$\begin{pmatrix} \hat{x}_{t+1} \\ \hat{y}_{t+1} \end{pmatrix} = \begin{pmatrix} x_t \\ y_t \end{pmatrix} + \Delta t \begin{pmatrix} -\hat{T}_{x,t+1}/Z_t + \hat{T}_{z,t+1}x_t/Z_t + \hat{\Omega}_{z,t+1}y_t \\ -\hat{T}_{y,t+1}/Z_t + \hat{T}_{z,t+1}y_t/Z_t - \hat{\Omega}_{z,t+1}x_t \end{pmatrix}$$

wherein, $\hat{T}_{x,t+1}$, $\hat{T}_{y,t+1}$, $\hat{T}_{z,t+1}$, $\hat{\Omega}_{z,t+1}$ are camera motion estimates.

The weighted value calculating section comprises a correlation matching weighted value calculating subsection for calculating a correlation matching weighted value by use of the camera motion from which the incorrect optical flow has been eliminated by the second camera motion calculating section; and a weighted value normalized calculating subsection for executing smoothing of a predetermined location estimated constant weighted value, an edge strength constant weighted value, and the calculated correlation matching weighted value, and providing each of the smoothed values to the optical flow calculating section. The correlation matching weighted value is calculated by the correlation matching weighted value calculating subsection in accordance with:

$$W_1 = W_{G,Init} + K_{Tz}|T_z| + K_{\Omega z}|\Omega_z|$$

wherein, $W_{G,Init}$ is an initial set value of the correlation matching weighted value.

The smoothing of the predetermined location estimated constant weighted value, the edge strength constant weighted value, and the calculated correlation matching weighted value are executed by the weighted value normalized calculating subsection in accordance with:

$$W_G = \frac{W_1}{W_1 + W_{Cl,Init} + W_{S,Init}}$$

$$W_{Cl} = \frac{W_{Cl,Init}}{W_1 + W_{Cl,Init} + W_{S,Init}}$$

$$W_S = \frac{W_{S,Init}}{W_1 + W_{Cl,Init} + W_{S,Init}}$$

wherein, $W_{Cl,Init}$ and $W_{S,Init}$ are the location estimated weighted value and the edge strength constant weighted value, respectively.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

An apparatus and method for estimating optical flow and camera motion using correlation matching and a system model in moving images according to one preferred embodiment of the present invention will now be explained with reference to the accompanying drawings.

Figure 1:
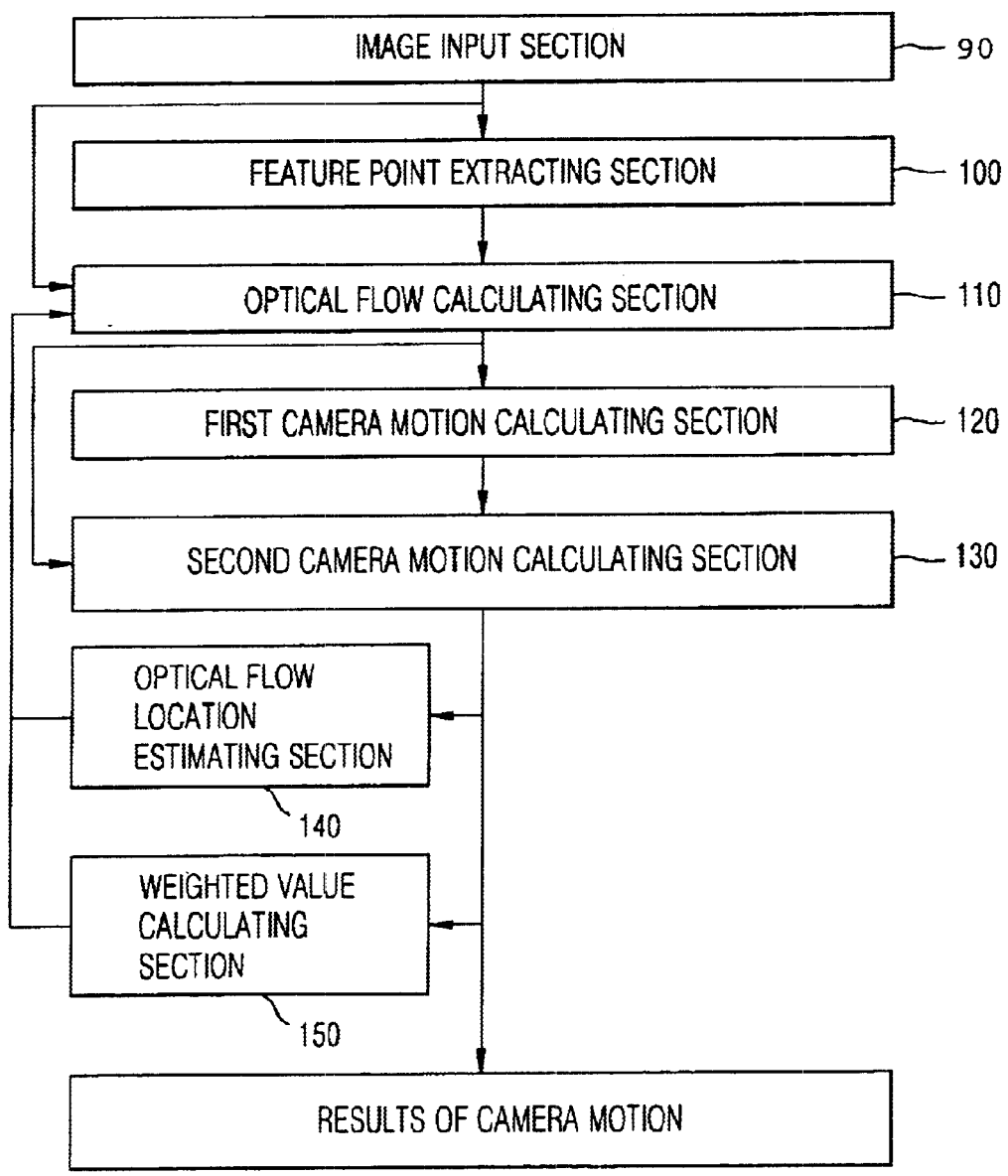
FIG. 1 is a block diagram of an apparatus and method for calculating optical flow and camera motion using correlation matching and a system model in moving images according to one preferred embodiment of the present invention.

FIG. 1 is a block diagram of an apparatus and method for calculating optical flow and camera motion using correlation matching and a system model in moving images according to one preferred embodiment of the present invention. The apparatus of the present invention comprises a feature point extracting section 100 for extracting a feature point of a sequence of images (previous image and current image) input from an image input section 90, an optical flow calculating section 110 for calculating an optical flow using the feature points extracted by the feature point extracting section 100, a first camera motion calculating section 120 for calculating camera motion using the optical flow calculated by the optical flow calculating section 110, a second camera motion calculating section 130 for eliminating an incorrect optical flow in the optical flow calculated by the optical flow calculating section 110 and the camera motion information calculated by the first camera motion calculating section 120 and recalculating the camera motion, an optical flow location estimating section 140 for estimating the location of the optical flow according to the camera motion calculated by the second camera motion calculating section 130, and a weighted value calculating section 150 for calculating a weighted value according to the camera motion calculated by the second camera motion calculating section 130.

The detailed construction and operation of each section will now be explained with reference to the accompanying drawings.

Figure 2:
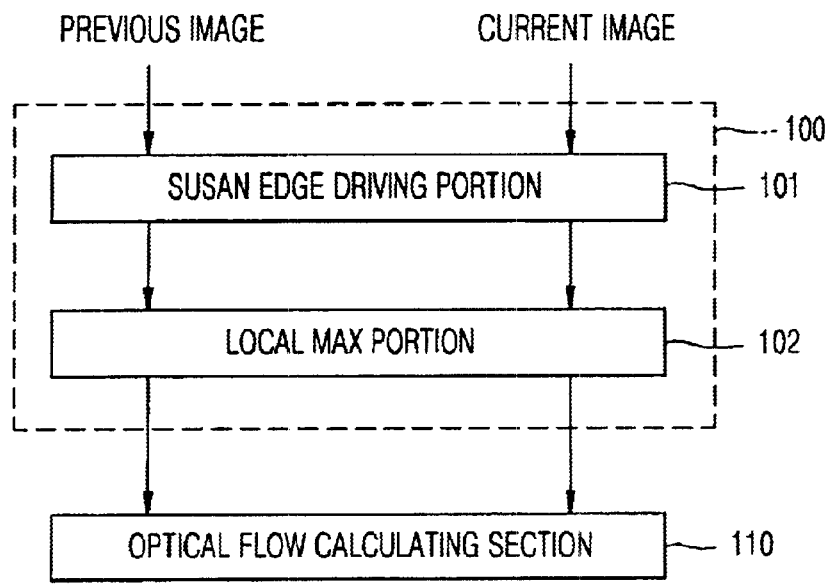
FIG. 2 is a block diagram of the feature point extracting section in FIG. 1.

FIG. 2 is a block diagram of the feature point extracting section in FIG. 1, with output therefrom. As shown in FIG. 2, the feature point extracting section 100 uses a SUSAN edge driving portion 101 and a local max portion 102 to extract a certain number of corner points, i.e., feature points, which can be obviously discriminated when seen visually. The SUSAN edge driving portion 101 finds the corner points in the edge image by use of the following equation 1:

$$S = \left\{ \sum_e -\left(\frac{I(x, y) - I(x+dx, y+dy)}{T}\right)^6 \right\} / G \quad \text{Equation 1}$$

wherein, I is a gray value, T is a threshold value for a difference between the gray values, and G is an edge strength difference between the feature point locations of the previous and current images.

In equation 1, if T is large, only a point at which a gray value variation is large is extracted as the feature point while, if T is small, a point at which a gray value variation is small is also extracted as a feature point. The criterion for selecting the feature points is dependent upon the value of G. In order to obtain a certain number of feature points, after a portion of an exponential function is calculated with the value T being constant, the value G is varied.

In order to find the corner point in the edge image obtained through the SUSAN edge driving portion 101, the local max portion 102 selects the largest value in a set mask size area to extract the corner point, i.e., the feature point.

If the number of the corner points calculated in the previous frame is smaller than a set range, the value of G has to be reduced. If the number of features does not belong to the set range even though the value of G is reduced, the value of T which is set in a look up table is altered, and simultaneously the mask size is reduced in the local max portion 102, thereby assisting in the extraction of more feature points.

The location of the extracted feature point and the edge strength of the location are provided to the optical flow calculating section 110.

Figure 3:
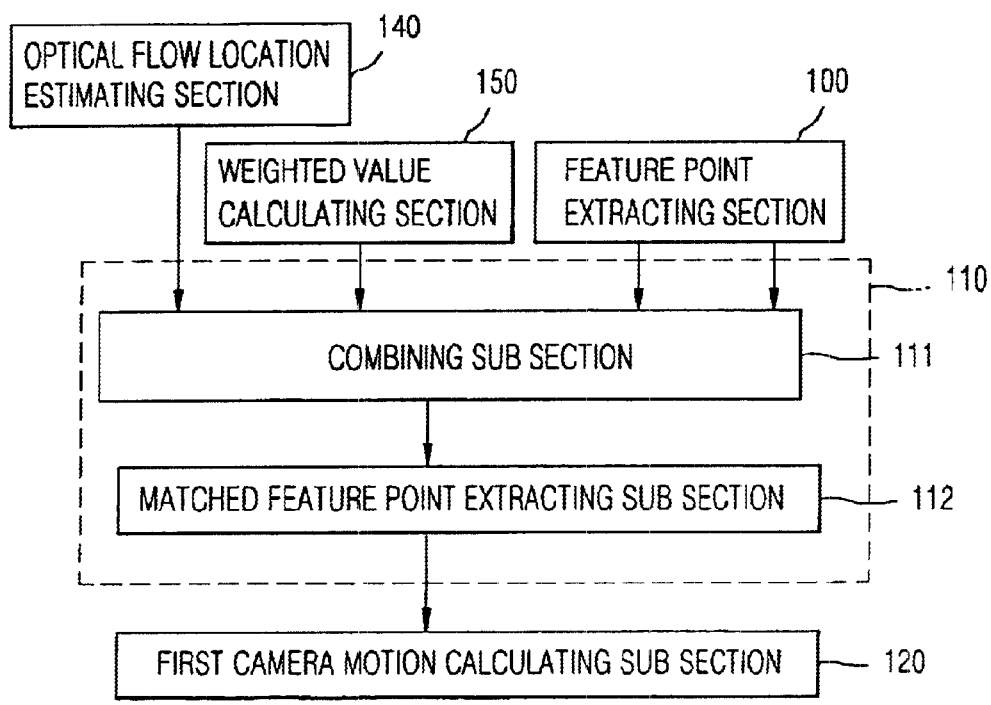
FIG. 3 is a block diagram of the optical flow calculating section in FIG. 1.

FIG. 3 is a block diagram of the optical flow calculating section in FIG. 1, with inputs and outputs thereto.

As shown in FIG. 3, a combining subsection 111 of the optical flow calculating section 110 calculates an edge connecting strength in accordance with the following equation 2:

$$E = W_G G + W_{Cl} Cl + W_S S \quad \text{Equation 2}$$

In other words, in equation 2, $W_G$, $W_{Cl}$, and $W_S$ are weighted values of a correlation matching, a location error matching and an edge strength matching, respectively. G is an edge strength difference between the feature point locations in the previous and current images provided from the feature point extracting section 100. In addition, Cl is a distance difference between the current feature point location and an estimated feature point location in the previous image provided from the optical flow location estimating section 140. S is a SUSAN edge strength difference between the feature points of the previous and current images provided from the feature point extracting section 100.

The combining subsection 111 calculates the connecting strength E of the edge using the distance difference between the current feature point location and the estimated feature point location in the previous image provided from the optical flow estimating section 140, the weighted values of the correlation, location incorrectness, and edge strength matching provided from the feature point extracting section 100, and the edge strength difference between the feature points of the previous and current images provided from the feature point extracting section 100. The calculated connecting strength E is supplied to the matched feature point extracting subsection 112.

Accordingly, the matched feature point extracting subsection 112 extracts the feature points having the largest connecting strength by use of the connecting strength value E provided from the combining subsection 111. The extracted feature points having the largest connecting strength are provided to the first camera motion calculating section 120 and the second camera motion calculating section 130, respectively.

The first camera motion calculating section 120 substitutes the optical flow received from the optical flow calculating section 110 in a formula induced by a system model and a camera projection to calculate the camera motion in accordance with a typical least square method.

A signal of the camera motion thus calculated is provided to the second camera motion calculating section 130.

Herein, the first camera motion calculating section 120 will now be explained with reference to FIG. 4.

Figure 4:
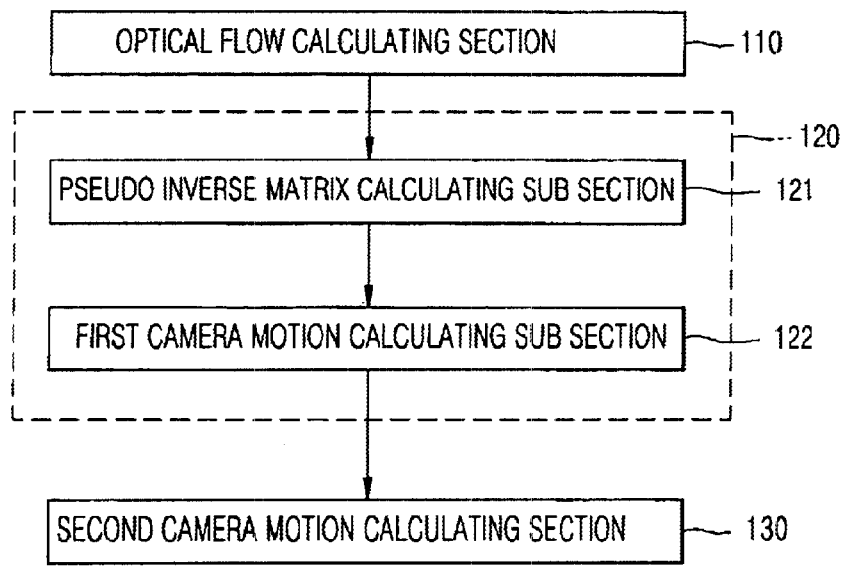
FIG. 4 is a block diagram of the first camera motion calculating section in FIG. 1.

FIG. 4 is a block diagram of the first camera motion calculating section in FIG. 1, with inputs and outputs thereto.

As shown in FIG. 4, a pseudo inverse matrix calculating subsection 121 of the first camera motion calculating section 120 calculates a constant of a camera projection formula by use of the optical flow provided from the optical flow calculating section 110, and provides the constant value of the camera projection formula to the first camera motion calculating subsection 122.

The first camera motion calculating subsection 122 divides the camera motion by use of the constant of the camera projection formula provided from the pseudo inverse matrix calculating subsection 121, and provides the resultant to the second camera motion calculating section 130.

Figure 5:
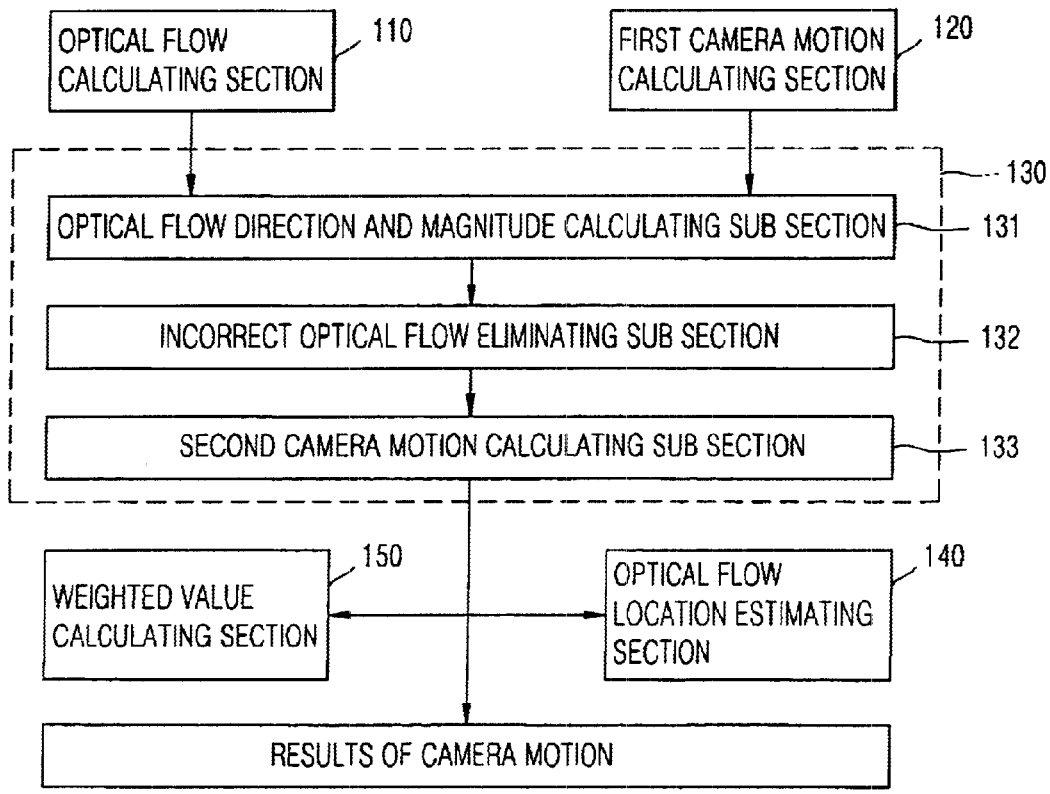
FIG. 5 is a block diagram of the second camera motion calculating section in FIG. 1.

FIG. 5 is a block diagram of the second camera motion calculating section 130 in FIG. 1, with inputs and outputs thereto.

Figure 8:
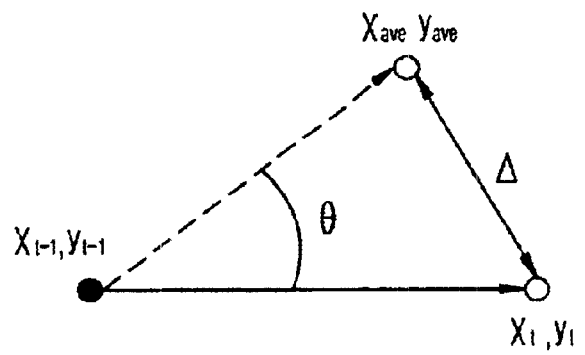
FIG. 8 is a view explaining incorrect optical evaluation in the incorrect optical flow eliminating section in FIG. 5.

As shown in FIG. 5, the second camera motion calculating section 130 eliminates an incorrect optical flow among the optical flows provided from the optical flow calculating section 110 on the basis of the camera motion provided from the first camera motion calculating section 120. An optical flow direction and magnitude calculating subsection 131 substitutes a value of the camera motion in the following equation 3 combined with the camera projection formula and the camera motion formula to calculate the direction and magnitude of the optical flow:

$$\begin{pmatrix} x_{Ave} \\ y_{Ave} \end{pmatrix} = \begin{pmatrix} x_t \\ y_t \end{pmatrix} + \Delta t \begin{pmatrix} -T_{x,y}/Z_t + T_{z,t}x_t/Z_t + \Omega_{z,t}y_t \\ -T_{y,t+1}/Z_t + T_{z,t}y_t/Z_t - \Omega_{z,t}x_t \end{pmatrix} \quad \text{Equation 3}$$

wherein, $\Delta t$ is a sampling time, $T_x$, $T_y$ and $T_z$ are x, y and z-axis translation of the camera, respectively, and $\Omega_z$ is z-axis rotation of the camera. $X_t$ and $y_t$ are locations in the current frame image, and $X_{Ave}$ and $y_{Ave}$ are standard locations. If a direction $\theta$ of the standard optical flow and a distance $\Delta$ between $x_{Ave}$ and $y_{Ave}$ are outside the set range, as shown in FIG. 8, an incorrect optical flow eliminating subsection 132 determines the calculated optical flow as a mismatched optical flow to eliminate the incorrect optical flow, and provides the residual optical flows to the second camera motion calculating subsection 133.

Specifically, after the incorrect optical flow among the optical flows calculated by the optical flow direction and magnitude calculating subsection 131 in accordance with the equation 3 has been eliminated by the incorrect optical flow eliminating subsection 132, the second camera motion calculating subsection 133 again calculates the camera motion using the residual optical flow.

The resulting calculated camera motion is provided to the optical flow location estimating section 140 and the weighted value calculating section 150, respectively.

Figure 6:
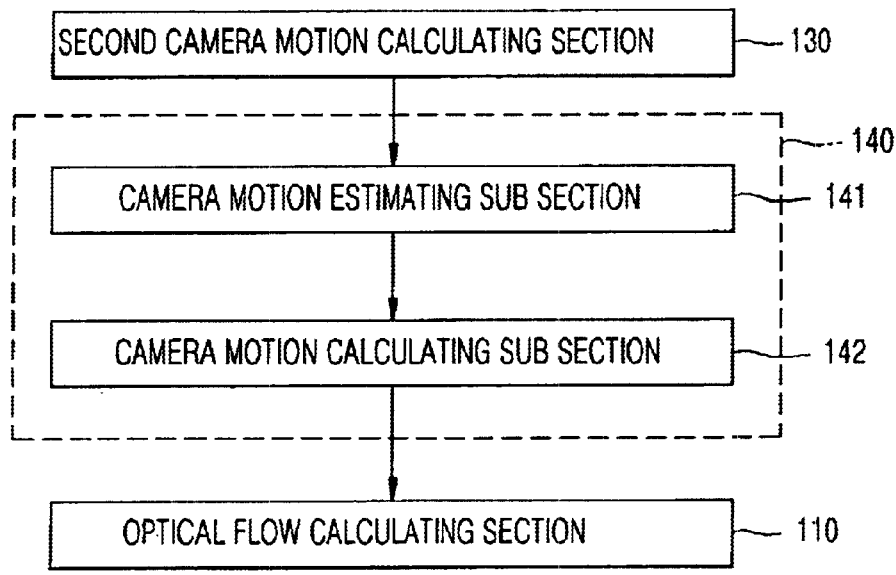
FIG. 6 is a block diagram of the optical flow location estimating section in FIG. 1.

FIG. 6 is a block diagram of the optical flow location estimating section 140 in FIG. 1, with inputs and outputs thereto.

Figure 9:
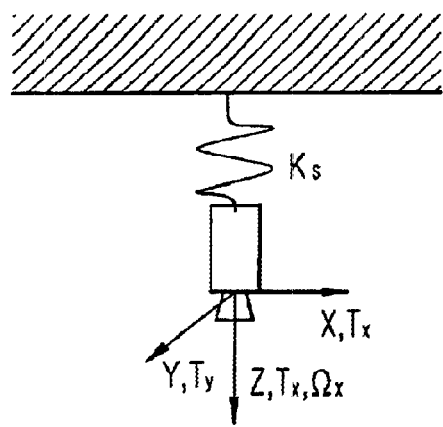
FIG. 9 is a view showing an example tested by installing a camera in a coil spring system, in which the system model applies a location estimating method to the optical flow location estimating section in FIG. 1.

As shown in FIG. 6, the optical flow location estimating section 140 estimates the location in accordance with the following equation 4 combined with the system model in which the camera is installed and the system camera projection, based on the optical flow and the camera motion provided from the second camera motion calculating section 130.

$$\begin{pmatrix} \hat{x}_{t+1} \\ \hat{y}_{t+1} \end{pmatrix} = \begin{pmatrix} x_t \\ y_t \end{pmatrix} + \Delta t \begin{pmatrix} -\hat{T}_{x,t+1}/Z_t + \hat{T}_{z,t+1}x_t/Z_t + \hat{\Omega}_{z,t+1}y_t \\ -\hat{T}_{y,t+1}/Z_t + \hat{T}_{z,t+1}y_t/Z_t - \hat{\Omega}_{z,t+1}x_t \end{pmatrix} \quad \text{Equation 4}$$

wherein, $\hat{T}_{x,t+1}, \hat{T}_{y,t+1}, \hat{T}_{x,t+1}, \hat{\Omega}_{x,t+1}$ are camera motion estimates, and can be obtained from the system model in which the camera is installed. Such a system is representatively shown in FIG. 9, using a camera motion estimating subsection 141 with an equation 5 and a camera motion calculating subsection 142, in a system model. In other words, FIG. 9 is a view showing an example tested by installing the camera in a coil spring system, in which the system model applies a location estimating method to the optical flow location estimating section 140.

$\hat{T}_{x,t+1} = T_{x,t} + k_1 \hat{T}_{x,t}$ $\hat{T}_{y,t+1} = T_{y,t} + k_1 \hat{T}_{y,t}$ $\hat{T}_{z,t+1} = (mg + mT_{z,t}/\Delta t - k_s Z_t)/(m/\Delta t + k_s \Delta t)$ $\hat{\Omega}_{x,t+1} = (I_z \Omega_{z,t} - k_b \Theta_{z,t})/(I_z + \Delta t k_b)$ $\Theta_{z,t+1} = \Theta_{z,t} + \Delta t \Omega_{z,t+1}$ \quad Equation 5 wherein, m is a weight of the system (camera), g is an acceleration of gravity, $K_s$, is a constant of a coil spring, $k_b$ is a constant of a rotational coil spring, $I_z$ is a moment of secondary inertia, and $\theta_z$ is a torsion angle of the coil spring. In the equation 4, $\hat{x}_{t+1}$, $\hat{y}_{t+1}$ are estimated locations, and are provided to the optical flow calculating section 110.

Figure 7:
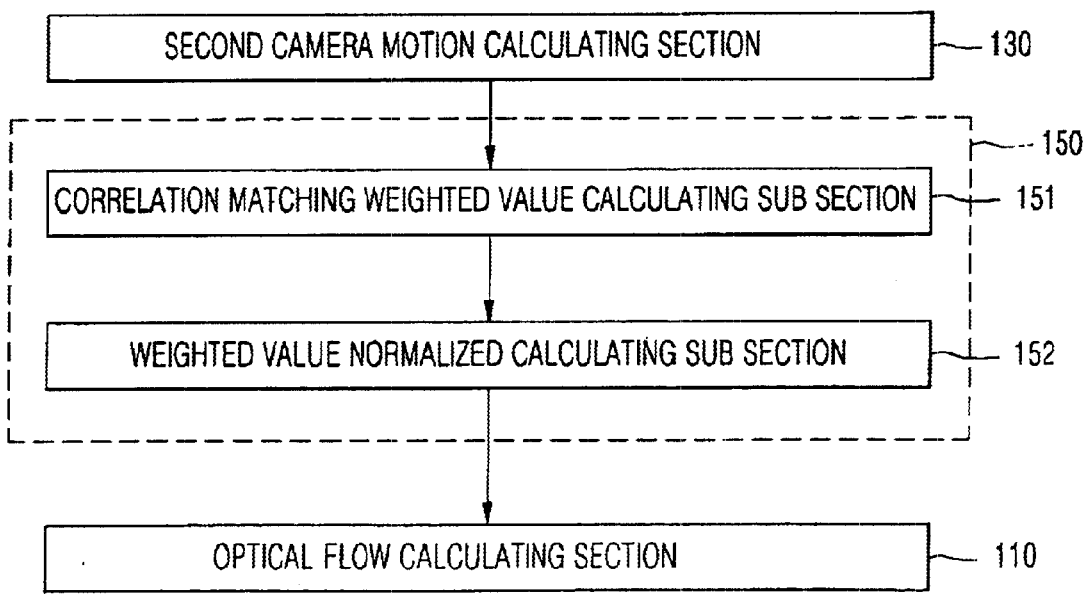
FIG. 7 is a block diagram of the weighted value calculating section in FIG. 1.

FIG. 7 is a block diagram of the weighted value calculating section 150 in FIG. 1, with inputs and outputs thereto.

As shown in FIG. 7, the weighted value calculating section 150 calculates a correlation matching weighted value by use of the camera motion provided from the second camera motion calculating section 130, after the incorrect optical flow has been eliminated, and provides a predetermined location estimated constant weighted value and an edge strength constant weighted value to the optical flow calculating section 110.

Since the reliability of the correlation matching value is reduced when an image rotation or zoom change has occurred, a correlation matching weighted value calculating subsection 151 decreases the correlation matching weighted value according to the following equation 6 when encountering the rotation and translation of an optical axis, i.e., a z-axis, of the camera.

$W_1 = W_{G,Init} + K_{T_z}|T_Z| + K_{\Omega_z}|\Omega_Z|$ \quad Equation 6 wherein, $W_{G,Init}$ is an initial set value of the correlation matching weighted value, i.e., an initial value which is input manually. A weighted value normalized calculating subsection 152, shown in FIG. 7, executes the smoothing of the predetermined location estimated constant weighted value, the edge strength constant weighted value, and the correlation matching variable weighted value calculated by the correlation matching weighted value calculating subsection 151 in accordance with the following equation 7, and provides the smoothed location estimated constant weighted value, the smoothed edge strength weighted value, and the smoothed correlation matching weighted value to the optical flow calculating section 110.

$$W_G = \frac{W_1}{W_1 + W_{Cl,Init} + W_{S,Init}}$$ Equation 7

$$W_{Cl} = \frac{W_{Cl,Init}}{W_1 + W_{Cl,Init} + W_{S,Init}}$$

$$W_S = \frac{W_{S,Init}}{W_1 + W_{Cl,Init} + W_{S,Init}}$$

wherein, $W_{Cl,Init}$ and $W_{S,Init}$ are the location estimated weighted value and the edge strength constant weighted value, respectively.

The method of the present invention may be recorded in a recording medium (for example, CD-ROM, RAM, ROM, floppy disc, hard disc, magneto-optical disc or the like) which is realized by a program to be readable by a computer.

With the construction and process described above, according to the apparatus and method for estimating optical flow and camera motion using correlation matching and a system model in moving images of the present invention, the system motion in which the CCD camera is installed may be calculated by employing a method of precisely and rapidly calculating the optical flow. That is, it can be applied to the motion extraction of an unmanned camera, an autonomic walking robot, a free-falling missile, an MPEG region or the like, in which quick calculation is needed.

The foregoing embodiment is merely exemplary and is not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for calculating an optical flow and a camera motion of a camera using correlation matching and a system model in moving images, the apparatus comprising:

feature point extracting means for extracting a feature point from each of a previous image and a current image in a sequence of input images;

optical flow calculating means for calculating an optical flow by determining a maximum edge connecting strength between the feature points extracted by the feature point extracting means;

first camera motion calculating means for calculating a camera motion using the optical flow calculated by the optical flow calculating means;

second camera motion calculating means for eliminating an incorrect optical flow from the optical flow calculated by the optical flow calculating means and calculating a second camera motion;

optical flow location estimating means for estimating a location of the optical flow by estimating a distance difference between an estimated feature point location and a current feature point location in the previous image according to the second camera motion calculated by the second camera motion calculating means; and weighted value calculating means for calculating a plurality of weighted values according to the second camera motion calculated by the second camera motion calculating means and providing the weighted value to the optical flow calculating means, said weighted values changing according to zoom and optical axis rotation of said camera and including weighted values of correlation matching, location error matching and edge strength matching.

2. The apparatus for calculating the optical flow and camera motion as claimed in claim 1, wherein the feature point extracting means comprises:

a SUSAN edge driving portion for extracting an edge image from the sequence of the input images;

and a local max portion for selecting a largest value in a mask size region set in the edge image extracted by the SUSAN edge extracting portion to extract a certain number of feature points.

3. The apparatus for calculating the optical flow and camera motion as claimed in claim 2, wherein the feature points are extracted by the local max portion in accordance with:

$$S = \left\{ \sum_e -\left(\frac{I(x, y) - I(x+dx, y+dy)}{T}\right)^6 \right\} / G$$

wherein, I is a gray value, T is a threshold value for a difference between the gray values, and G is an edge strength difference between feature point locations of the previous and current images.

4. The apparatus for calculating the optical flow and camera motion as claimed in claim 1, wherein the optical flow calculating means comprises:

a combining section for calculating the connecting strength of an edge using the distance difference between the current feature point location and the estimated feature point location in the previous image provided from the optical flow location estimating means, the weighted values of the correlation, location incorrectness, and edge strength matching provided from the weighted value calculating means, and the edge strength difference between the feature points of the previous and current images provided from the feature point extracting means; and a feature point extracting section for extracting the feature points of the largest connecting strength by use of the connecting strength value provided from the combining section and providing the extracted feature points to the first and second camera motion calculating means.

5. The apparatus for calculating the optical flow and camera motion as claimed in claim 4, wherein the edge connecting strength E is calculated by the combining section in accordance with:

$$E = W_G G + W_{Cl} Cl + W_S S$$

wherein, $W_G$ is the weighted value of correlation matching, $W_{Cl}$ is the weighted value of location error matching, $W_S$ is the weighted value of edge strength matching, G is an edge strength difference between the feature point locations in the previous and current images provided from the feature point extracting means, Cl is the distance difference between the current feature point location and the estimated feature point location in the previous image provided from the optical flow location estimating means, and S is a SUSAN edge strength difference between the feature points of the previous and current images provided from the feature point extracting means.

6. The apparatus for calculating the optical flow and camera motion as claimed in claim 1, wherein the first camera motion calculating means comprises:

a pseudo inverse matrix calculating section for calculating a constant of a camera projection formula by use of the optical flow provided from the optical flow calculating means; and a camera motion calculating section for dividing the camera motion by use of the constant of the camera projection formula provided from the pseudo inverse matrix calculating section, and providing the resultant to the second camera motion calculating means.

7. The apparatus for calculating the optical flow and camera motion as claimed in claim 1, wherein the second camera motion calculating means comprises:

an optical flow direction and magnitude calculating section for calculating a direction and magnitude of the optical flow by use of a value of the camera motion calculated by the first camera motion calculating means;

an incorrect optical flow eliminating section for eliminating an incorrect optical flow from the optical flow provided by the optical flow calculating means depending upon the direction and magnitude of the optical flow calculated by the optical flow direction and magnitude calculating section; and a camera motion calculating section for calculating the camera motion by use of the optical flow which is not eliminated by the incorrect optical flow eliminating section, and providing the camera motion to the weighted value calculating means and the optical flow location estimating means, respectively.

8. The apparatus for calculating the optical flow and camera motion as claimed in claim 7, wherein the direction and magnitude of the optical flow are calculated by the optical flow direction and magnitude calculating section in accordance with:

$$\begin{pmatrix} x_{Ave} \\ y_{Ave} \end{pmatrix} = \begin{pmatrix} x_t \\ y_t \end{pmatrix} + \Delta t \begin{pmatrix} -T_{x,y}/Z_t + T_{z,t}x_t/Z_t + \Omega_{z,t}y_t \\ -T_{y,t+1}/Z_t + T_{z,t}y_t/Z_t - \Omega_{z,t}x_t \end{pmatrix}$$

wherein, $\Delta t$ is a sampling time, $T_x$, $T_y$ and $T_z$ are x, y and z-axis translation of the camera, respectively, and $\Omega_z$ is z-axis rotation of the camera, $x_t$, and $y_t$ are locations in the current frame image, and $x_{Ave}$ and $y_{Ave}$ are standard locations.

9. The apparatus for calculating the optical flow and camera motion as claimed in claim 8, wherein if a direction $\theta$ of a standard optical flow and a distance $\Delta$ between $x_{Ave}$ and $y_{Ave}$ are outside a predetermined range, the incorrect optical flow eliminating section determines the calculated optical flow as a mismatched optical flow to eliminate the incorrect optical flow.

10. The apparatus for calculating the optical flow and camera motion as claimed in claim 1, wherein the optical flow location estimating means estimates the camera motion, depending upon the optical flow from which the incorrect optical flow is eliminated, and the camera motion provided from the second camera motion calculating means, in accordance with:

$$\begin{pmatrix} \hat{x}_{t+1} \\ \hat{y}_{t+1} \end{pmatrix} = \begin{pmatrix} x_t \\ y_t \end{pmatrix} + \Delta t \begin{pmatrix} -\hat{T}_{x,t+1}/Z_t + \hat{T}_{z,t+1}x_t/Z_t + \hat{\Omega}_{z,t+1}y_t \\ -\hat{T}_{y,t+1}/Z_t + \hat{T}_{z,t+1}y_t/Z_t - \Omega_{z,t+1}x_t \end{pmatrix}$$

wherein, $\hat{T}_{x,t+1}$, $\hat{T}_{y,t+1}$, $\hat{T}_{x,t+1}$, $\hat{\Omega}_{x,t+1}$ are camera motion estimated.

11. The apparatus for calculating the optical flow and camera motion as claimed in claim 1, wherein the weighted value calculating means comprises:

a correlation matching weighted value calculating section for calculating the correlation matching weighted value by use of the camera motion in which the incorrect optical flow has been eliminated by the second camera motion calculating means; and a weighted value normalized calculating section for executing smoothing of a predetermined location estimated constant weighted value, an edge strength constant weighted value, and the calculated correlation matching weighted value, and providing each of the smoothed values to the optical flow calculating means.

12. The apparatus for calculating the optical flow and camera motion as claimed in claim 11, wherein the correlation matching weighted value is calculated by the correlation matching weighted value calculating section in accordance with:

$$W_1 = W_{G,Init} + K_{T_Z}|T_Z| + K_{\Omega_Z}|\Omega_Z|$$

wherein, $W_{G,Init}$ is an initial set value of the correlation matching weighted value.

13. The apparatus for calculating the optical flow and camera motion as claimed in claim 11, wherein the smoothing of the predetermined location estimated constant weighted value, the edge strength constant weighted value, and the calculated correlation matching weighted value are executed by the weighted value normalized calculating section in accordance with:

$$W_G = \frac{W_1}{W_1 + W_{Cl,Init} + W_{S,Init}}$$

$$W_{Cl} = \frac{W_{Cl,Init}}{W_1 + W_{Cl,Init} + W_{S,Init}}$$

$$W_S = \frac{W_{S,Init}}{W_1 + W_{Cl,Init} + W_{S,Init}}$$

wherein, $W_{Cl,Init}$ and $W_{S,Init}$ are the location estimated weighted value and the edge strength constant weighted value, respectively.

* * * * *